United States Patent [19]

Ohler et al.

[11] Patent Number: 5,235,701
[45] Date of Patent: Aug. 10, 1993

[54] METHOD OF GENERATING AND ACCESSING A DATABASE INDEPENDENT OF ITS STRUCTURE AND SYNTAX

[75] Inventors: Peter C. Ohler, Lafayette; Xin Gu, Albany, both of Calif.

[73] Assignee: Teknekron Communications Systems, Inc., Berkeley, Calif.

[21] Appl. No.: 574,587

[22] Filed: Aug. 28, 1990

[51] Int. Cl.$^5$ .............................................. G06F 15/40
[52] U.S. Cl. .................................... 395/600; 395/425; 364/DIG. 1; 364/282.1; 364/283.4; 364/280; 364/280.4
[58] Field of Search .................... 395/600, 700, 425

[56] References Cited

U.S. PATENT DOCUMENTS

| 4,774,661 | 9/1988 | Kumpati | 395/600 |
| 4,930,071 | 5/1990 | Tou et al. | 395/600 |

OTHER PUBLICATIONS

Fishman, D. H., et al., "Iris: An Object-Oriented Database Management System", ACM Transactions on Office Information Systems, vol. 5, No. 1, Jan. 1987, pp. 48–69.

Duff, Charles B., "Designing an Efficient Language," Byte, Aug. 1986, pp. 211–224.

Declaration of Peter C. Ohler, filed Jun. 24, 1991 and the Agreement attached thereto.

*Primary Examiner*—Paul V. Kulik
*Attorney, Agent, or Firm*—Limbach & Limbach

[57] ABSTRACT

A method of generating and accessing a database table having data stored in a unique structure and syntax is disclosed. A database access library having an access function is created. The access function of the database access library is mapped to the database table. A data object is also created. The data object has a plurality of data attributes. Each data attribute of the data object is mapped to the database table using the access function. Accessing of the data object is independent of the structure and syntax of the database table.

3 Claims, 1 Drawing Sheet

METHOD OF GENERATING AND ACCESSING A DATABASE INDEPENDENT OF ITS STRUCTURE AND SYNTAX

TECHNICAL FIELD

The present invention relates to a method of generating and accessing data stored in a database having a unique structure and syntax, where the access to the data stored in the database can be made independent of the structure and syntax. More particularly, the present invention relates to a computer program to accomplish the foregoing method.

BACKGROUND OF THE INVENTION

Databases are well known in the art. Databases are created by a program operating under the control of a computer. A database is in general characterized by a database table having a plurality of fields with each field having a unique structural relationship to one another. Access to the data stored in the database table is also prescribed by unique syntax rules defined by the manufacturer or programmer constructing the database. Many examples of well known databases include: Oracle Relational Database Management System from Oracle Systems, Inc., and Informix Relational Database Management System from Informix.

Object programming is also well known in the art. Similar to a database, objects are also created by a program operating under the control of a computer. In object programming, the object is a data structure having procedures attached to it wherein the data is operated upon by the procedure. Each object can also contain data structure wherein the type of data and the variable name associated with that data is defined. These will be referred to as attributes of the object.

In the prior art, to define an object having attributes that are linked to the elements in a database table, the programmer had to define each object with its associated attribute linked to the particular field of the database table taking into account the structure and syntax of the database to which the data structure is linked. This linkage would be accomplished at compile time. There are at least two drawbacks to this prior art method. First, because each database has its unique structure and syntax, if the program were used with a different database table, all of the objects must be redefined with respect to the structure and syntax of the different database. The second problem is that each data object must be defined with precision and care and mapped to the database table. In the course of writing a program that acts on the data from the database, if a new object were defined, it too must be defined with respect to the elements within the database table. Errors can arise from the mapping of the attributes of data objects to the database table.

SUMMARY OF THE INVENTION

In the present invention a method of generating a database table which has a unique structure and syntax such that access thereto is independent of the structure and syntax is disclosed. The data is stored in the database table. A database access library having an access function is created. The access function of the database access library is mapped to the database table. A data object is also created. The data object has a plurality of data attributes. Each data attribute of the data object is mapped to the database table using the access function. Thus, accessing the data object is independent of the structure and syntax of the database table.

DETAILED DESCRIPTION OF THE DRAWINGS

Figure 1:
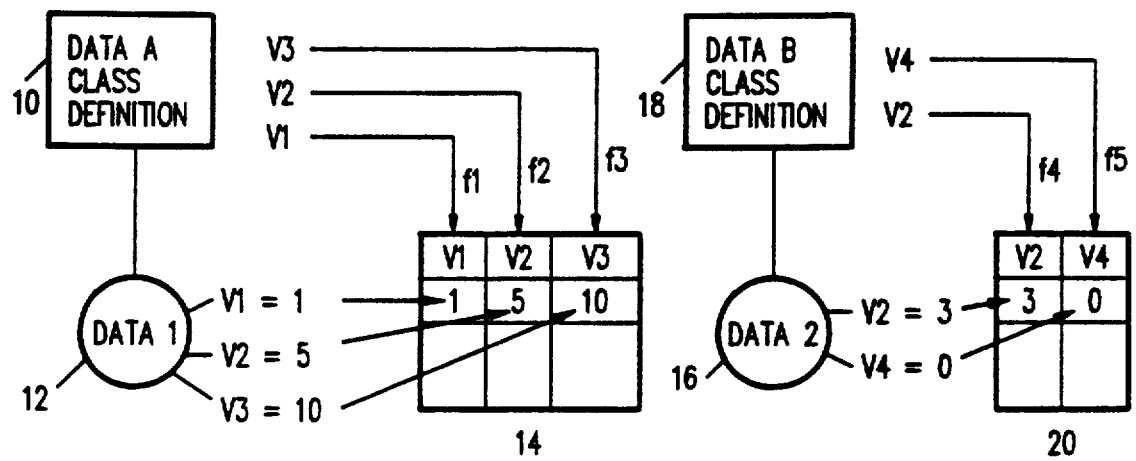
FIG. 1 is a schematic diagram showing the method of the prior art wherein data objects have attributes that are mapped directly to a database table.

Referring to FIG. 1, there is shown a schematic drawing of the method of the prior art. In the prior art, a class 10 contains the class definition of the data, in this case DATA A. An object 12 is defined as belonging to the class 10. The class 10 defines what the structure of the data in the object 12 is. The class 10 has a number of data structures shown as V1, V2 and V3. Each of the data structures V1, V2, and V3 is defined with reference to a database table 14. The data object 12 has a plurality of attributes which are data values assigned to the data attributes V1, V2 and V3. Thus, the object 12 contains the data of 1, 5 and 10 for the data name variables of V1, V2 and V3, respectively.

In the prior art, each attribute of the data object 12 and the class definition 10 to which it is associated is mapped to one of the fields of the database table 14. This mapping is accomplished by a function for each attribute. Thus, the data structure V1 is mapped onto the column or field also called V1, in the database table 14, through the function f1. Because access of each column in the database table 14 must be in accordance with the structure of the database table 24 and in accordance with the syntax to access the field V1, the function f1 which defines the access from the class 10 to the database table 14 for the data structure V1 is different from all of the other functions f2, and f3. Each of the functions f1, f2, and f3 had to be separately created, by the programmer. One example of the function f1 is to "take the third variable in class 10 and write into the third column of the database table 14". As can be seen, the location of the data structure, (i.e. third variable) had to be specified and mapped specifically to a particular location (i.e. third column) in the database table 14, taking into account the syntax of accessing the database table 14.

Further, in the prior art, in the event it is desired to define a new object 16, one must create the object 16 with a new class definition 18 attached thereto. Further, most often, the second class 18 is defined with reference to a second, different database table 20 (albeit from the same database program, such as Oracle, Informix, etc.). Thus, the mapping of the attributes of the second class 18 to the fields or columns in the second database table 20 had to be prepared as well with each individual function written for the mapping. Thus, creation of new objects 16 in the prior art necessitated the writing of new mapping functions f4 and f5 from the class 18 to which the new data object 16 belonged and the new database table 20 to which the attributes of the class 18 are mapped.

The creation of the data objects 12 and 16 and their relationship to the databases tables 14 and 20 in the prior art was accomplished by the use of an object oriented compiler language such as C++. Compiler languages have the advantage over interpreter languages in that once the program is written, a compiled program is generally faster in its execution.

Figure 2:
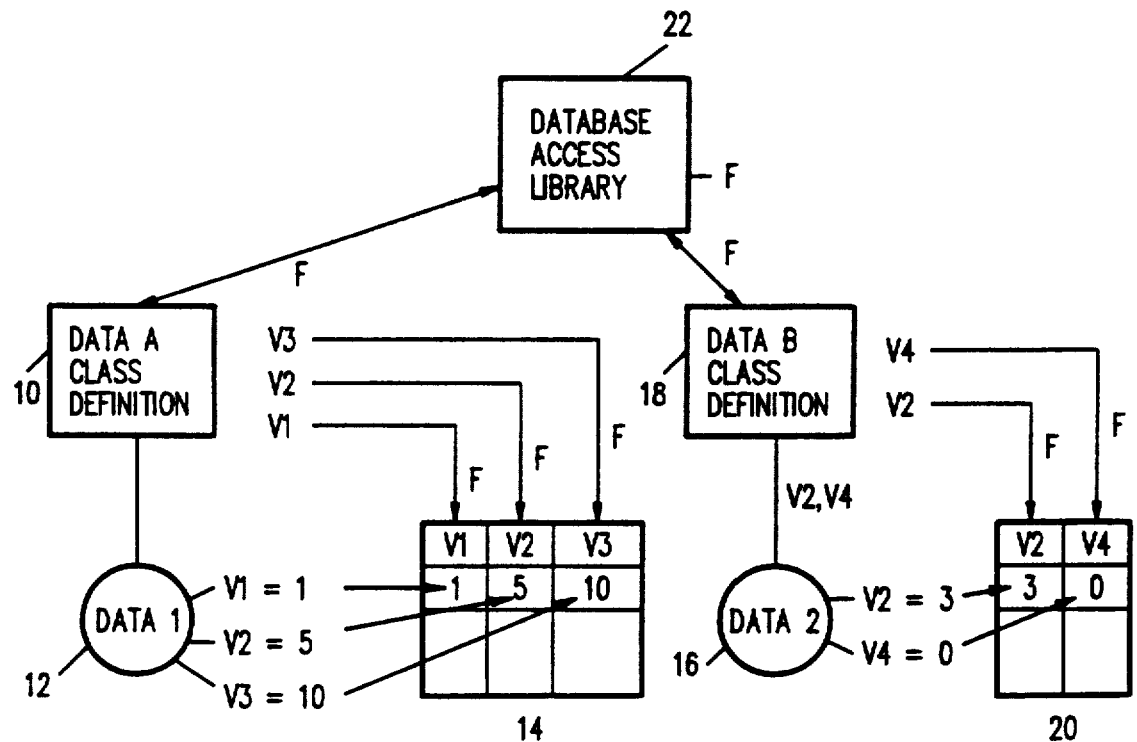
FIG. 2 is a schematic diagram showing the method of the present invention.

Referring to FIG. 2, there is shown a schematic drawing of the method of the present invention. In the method of the present invention, a database access library 22 is created. The database access library 22 has a function F that takes each variable name in the class and maps it into the corresponding column name of a database table. An example of the function F is "take the variable name of the data attribute to which this function is to operate upon and map that data attribute to the corresponding name of the column in the database table 14." As can be seen from this example, neither the location of the data attribute nor the location of the column has to be specified. What has to be specified is the column of the database table 14 in accordance with the structure and syntax of the database program. Further, the variable name and the type of data associated with the data must be known.

One or more database classes 10 and others are created. Each database class 10 is a class which inherits the function F from the database access library 22. Similar to the example in FIG. 1, the database class 10 has a plurality of data structures (V1, V2 and V3). Each of the data attributes of the database class 10 is mapped to a column within the database table 14. The mapping of the attributes of the database class 10 to the columns in the database tables 14 is based upon the function F inherited from the database access library 22. The function F links or maps the particular data structure to a particular field or column in the database table 14. An object 12 is then created, defined within the class 10. The data structure of the object 12 is created by writing data to the particular fields of the database table 14, using the function F.

In the event a programmer desires to access a piece of data which is not defined by an object, a new object 16 is created. Similar to the prior art, the new object 16 would belong to a new class 18. However, the new class 18 also inherits the function F from the database access library 22. Thus, the attributes of the new class 18 would be mapped onto a new database 20 automatically.

In the preferred embodiment, the method of the present invention is accomplished by generating a computer program written in the CFlavors language (a library for the C language available from Teknekron Communications Systems, Inc. of Berkeley, California). CFlavors is a C library for the C language that resolves variable names at run time. Although CFlavors library is used, any other object oriented interpreter language that supports type information at run time can be used. These include but are not limited to: CFlavors, Lisp Flavors and CLOS (Common Lisp Object System).

The use of an object oriented interpreter language that supports type information at run time is preferred because the relative structure, element and location, in short the access function F can be inherited automatically at run time. Thus, through the use of an object oriented language that supports type information at run time, to define each new object with the method of the present invention, all the programmer has to do is to create and define a new data object 14 within a class which inherits the function F from the database access library.

Furthermore, as can be seen from the foregoing, the objects created by the present method are accessed independent of the structure and syntax of the database in which the data is stored. Thus, in the event the program with the objects is to be used with a different database, all that has to be changed is the database access library 22 and its access function F. The portion of the program defining the objects and the use of the objects can remain unchanged.

An example of the creation of a test object having the automatic linkages described hereto is attached as a program on Exhibit A. The various portions of the code are explained as follows:

1. The program is connected or linked to a database.
2. A database access library is created.
3. A new class called "employee" has functions from the database access library is inherited.
4. The variables of the class called "employee" are defined.
5. The object called "current" is created.
6. A database table called "tablename" is created.
7. Data is placed into the object called "current" created in step 5.
8. The data values in the object called "current" are written into the database.
9. More objects are created. They are entitled "second" and "third".
10. Values are set for the objects "second", and "third".
11. As a group, the objects "current", "second" and "third", are inserted into the database.
12. A value in the object called "current" is changed.
13. The value in the database is updated.
14. Find a list of object.
15. Display the list of objects. This step refers to another procedure which actually prints out the objects.

This program was executed using the CFlavors library.

There are many advantages to the method of the present invention. First and foremost is that data objects can be created which link to and access elements of a database table with the object being totally independent of the structure and syntax of the database table 14. Thus, in the event a new database program were employed, changing the structure and syntax of the database tables 14 and 20, the only part of the program that has to be changed is the database access library 22. Secondly, new data objects can be created through the use of an object oriented interpreter language that supports type information at run time, objects are automatically linked to the database access library 22. This greatly facilitates creation of new data objects. Although at first blush the creation of data objects during run time has the disadvantage in that execution of the code of the process is slower than the creation of the data objects at compile time, the advantages afforded by the method of the present invention, namely the automatic linking of the data objects to the database access library outweigh any such disadvantage. Further, as speed of hardware continues to increase, the degradation in execution time caused by the set up of the data objects at run time becomes negligible.

EXHIBIT A

```
# include <stdio.h>
#include "environ.h"
# include "cflavors.h"
# include "dbflavor.h"
#include "cons.h"

extern char*    gets();
extern int      printf();

main()
{
        Flavor          *testf;
        Instance        *current, *second, *third;
        int             check;
        char            tablename[10];
        float           f;
        int             i;
        char            **type;
        int             size, instOrClass;
        Pntr            initValue;
        List            result;
        void            DisplayResult();
        List            objectsL;
        char            *fieldsarray[2];
        Flavor          *dbmixin;

cf_printf = printf;
        cf_gets = gets;
```

① `dbConnect("sara", "anne", "t:murphy:test");`

② 
```
if ((dbmixin = _dbMix()) == NULL)
        exit(1);
```

③ 
```
/* define flavor testf which inherites from dbMix */
if ((testf = cfDefFlavor("emplyee", "dbMix",0 ))== NULL)
            exit(1);
type = (char **)malloc(sizeof(char) * 10);
```

```
/* define some variables for testf, obj_id is a required variable */
cfAddVariable((Pntr)testf, "obj_id", ALL | INSTANCE,int, 0);
cfAddVar((Pntr)testf, "ename", ALL | INSTANCE,
                (unsigned int)(20*sizeof(char)),"char[]");
cfAddVariable((Pntr)testf, "age", ALL | INSTANCE, int, 0);
cfAddVariable((Pntr)testf, "salary", ALL | INSTANCE,float, 0);
```

④ 
```
cfStoreInstances((Pntr)testf);
if (cfCompileFlavor((Pntr)testf) == -1)
        exit(1);
```

⑤ 
```
current = cfMakeInstance((Pntr)testf, INIT);
strcpy(tablename, "emp");
```

⑥ 
```
/* this is required for persistency */
cfSend(current, "pset-tablename", tablename);
```

`/*    cfBrowser("Before set", "suspend"); */`

⑦ 
```
/* set values for object current */
cfSend(current, "set-obj_id", 20);
cfSend(current, "pset-ename", "Bruce");
i = 28;
f = 1000.03;
cfSend(current, "set-age", i);
cfSend(current, "pset-salary", &f);
```

⑧ 
```
cfSend(current, "describe");
cfBrowser("After set values ", "suspend");
```

```
/*
cfVarInfo(testf, "ename", type, &size, &instOrClass, initValue);
printf("type is %s\n", *type);
*/
```

```
/* test Insertdb method */
cfSend(current, "Insertdb");
cfSend(current, "describe");
cfBrowser("After Insertdb", "suspend");

second = cfMakeInstance(testf, INIT);
third  = cfMakeInstance(testf, INIT);

cfSend(second, "pset-ename", "Paul");
i = 50;
f = 4000.03;
cfSend(second, "pset-age", &i);
cfSend(second, "pset-salary", &f);
cfSend(third, "pset-ename", "Lai");
i = 38;
f = 3890.03;
cfSend(third, "pset-age", &i);
cfSend(third, "pset-salary", &f);

objectsL = NULL;

Push(current, objectsL);
Push(second,  objectsL);
Push(third,   objectsL);

dbMultiInsertObj(objectsL);

cfBrowser("After dbMultiInsertObj", "suspend");

/* test Selectdb method */
cfSend(current, "Selectdb");
cfSend(current, "describe");
cfBrowser("After Selectdb", "suspend");

/* change the id name and select again */
i = 50;
cfSend(current, "pset-id-name", "age");
cfSend(current, "pset-age", &i);
cfSend(current, "Selectdb");
cfSend(current, "describe");
cfBrowser("After Selectdb on id :age=50", "suspend");

/* test Updatedb method */
f = 1100.34;
cfSend(current, "pset-salary", &f);
cfSend(current, "Updatedb");
cfSend(current, "describe");
cfBrowser("After Updatedb", "suspend");

db_error[0] = '\0';

/* test db-select-self method */
if (cfSend(current, "db-select-self", "age=50 and ename='Paul'")
            == NULL) {
        if (db_error[0] != '\0')
                printf("%s\n", db_error);
} cfSend(current, "describe");
cfBrowser("After db-select-self", "suspend");

/* test db-example-select-self method */
cfSend(current, "pset-ename", "Lai");
i = 38;
cfSend(current, "pset-age", &i);

fieldsarray[0] = "ename";
fieldsarray[1] = "age";

db_error[0] = '\0';

if (cfSend(current, "db-example-select-self", 2, fieldsarray)
            == NULL) {
        if (db_error[0] != '\0')
                printf("%s\n", db_error);
}
```

```
cfSend(current, "describe");
cfBrowser("After db-example-select-self", "suspend");

/* test Deletedb method */
cfSend(current, "Deletedb");
cfBrowser("After Delete", "suspend");

if (dbFlavorInsertStr(testf, "obj_id, ename, age, salary",
                             "106, 'John', 23, 120032.3")
     == UNSUCCESS)
     exit(0);
if ((result = dbObjFlavorSelectStr(testf, "obj_id, ename, age, salary", ""
                      == NULL)
     if (db_error[0] != '\0')
             exit(0);
DisplayResult(result);
dbFreeSelectResultList(&result);

/* test unset-table method */
/*
cfSend(current, "unset-table");
*/
dbClose();
} void
DisplayResult(result)
      List     result;
{

Cons          *cp;
      Instance      *current;

Dolist(cp, result) {
             current = (Instance *)(cp->car);
             cfSend(current, "describe");
      } return;
}
```

What is claimed is:

1. A method of accessing data stored in a database table with a unique structure and syntax, by a program operating under the control of a computer to access said data independent of said structure and syntax, comprising the steps of:

creating a database access library having an access function, said access function mapping said database access library to said database table in accordance with the structure and syntax of said database table;

defining a database class, having a plurality of data attributes;

linking each data attribute of said database class to said database table by said access function inherited from said database access library through execution of an object oriented interpreter language that supports type information at run time;

creating a data object in said database class having said plurality of data attributes linked to said database table by said access function; and accessing said data object to access the data stored in said database table wherein said accessing of said data object accesses the data stored in said database table independent of said structure and syntax.

2. The method of claim 1 wherein said database table has a plurality of fields.

3. The method of claim 2 wherein each data attribute of said data object is linked to a field of said database table.

* * * * *